US007227993B2

(12) United States Patent
Xu et al.

(10) Patent No.: US 7,227,993 B2
(45) Date of Patent: Jun. 5, 2007

(54) LEARNING-BASED SYSTEM AND PROCESS FOR SYNTHESIZING CURSIVE HANDWRITING

(75) Inventors: Ying-Qing Xu, Beijing (CN); Heung-Yeung Shum, Beijing (CN); Jue Wang, Beijing (CN); Chenyu Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/353,102

(22) Filed: Jan. 27, 2003

(65) Prior Publication Data

US 2004/0148577 A1   Jul. 29, 2004

(51) Int. Cl.
  *G06K 9/34* (2006.01)
  *G06K 9/18* (2006.01)
  *G06K 9/00* (2006.01)
  *G06K 9/46* (2006.01)
(52) U.S. Cl. ............... 382/179; 382/186; 382/187; 382/190
(58) Field of Classification Search ............. 382/179, 382/190
  See application file for complete search history.

(56) References Cited

U.S. PATENT DOCUMENTS

| 5,341,438 | A | * | 8/1994 | Clifford | 382/179 |
| 5,487,117 | A | * | 1/1996 | Burges et al. | 382/173 |
| 5,535,119 | A | * | 7/1996 | Ito et al. | 704/3 |
| 5,555,556 | A | * | 9/1996 | Ozaki | 382/173 |
| 5,644,648 | A | * | 7/1997 | Bose et al. | 382/177 |
| 5,852,676 | A | * | 12/1998 | Lazar | 382/173 |
| 6,104,833 | A | * | 8/2000 | Naoi et al. | 382/190 |

OTHER PUBLICATIONS

Beigi, H., Pre-processing the dynamics of on-line handwriting data, feature extraction and recognition, *Proceedings of the International Workshop on Frontiers of Handwriting Recognition*, Colchester, England, Sep. 2-5, 1996, pp. 255-258.

Casey, R., E. Lecolinet, A survey of methods and strategies in character segmentation, *IEEE Transactions on Pattern Analysis and Machine Intelligence (PAMI)*, Jul. 1996, vol. 18, No. 7, pp. 690-706.

(Continued)

*Primary Examiner*—Wenpeng Chen
*Assistant Examiner*—Yuzhen Ge
(74) *Attorney, Agent, or Firm*—Lyon & Harr, L.L.P.; Craig S. Fischer

(57) ABSTRACT

A process and system for modeling, learning and synthesizing cursive handwriting in a user's personal handwriting style. The handwriting synthesis system and process described herein addresses the problem of learning the personal handwriting style of a user based on limited handwriting samples and producing novel scripts of the same style. The handwriting synthesis process includes segmenting handwriting samples into individual characters using a two-level writer-independent segmentation process, aligning samples of the same character into a common coordinate frame, and learning and modeling the individual character. Synthesis of handwriting is performed by generating individual letters from the models and concatenating the letters using a conditional sampling algorithm. The result is a smooth and fluid connection between letters that successfully mimics the personal handwriting style of a user.

6 Claims, 19 Drawing Sheets

OTHER PUBLICATIONS

Chen, H., O. E. Agazzi, C. Y. Suen, Piecewise linear modulation model of handwriting, *Int. Conf. on Document Analysis and Recognition*, (ICDAR '97), Ulm, Germany, Aug. 1997, vol. 1, pp. 363-367.

Cootes, T. F. and C. J. Taylor, Statistical models of appearance for computer vision, Draft report, Wolfson Image Analysis Unit, University of Manchester.

Duta, N., Jain, A.K., Dubuisson-Jolly, M.P., Automatic construction of 2D shape models, *IEEE Transactions on Pattern Analysis and Machine Intelligence*, May 2001, vol. 23, No. 5, pp. 433-446.

Guerfali. W., and R. Plamondon. The delta lognormal theory for the generation and modeling of cursive characters, *Proceedings of the International Conference on Document Analysis and Recognition*, 1995, pp. 495-498.

Guyon I., Handwriting synthesis from handwritten glyphs, *Proc. IWFHR-5*, 1996, Essex Univ., UK.

Li, X., M. Parizeau and R. Plamondon, Segmentation and reconstruction of on-line handwritten scripts, *Pattern Recognition*, Jun. 1998, vol. 31, pp. 675-684.

Miller, E., N. Matsakis and P. Viola, Learning from one example through shared densities on transforms, *Proceedings IEEE Conference on Computer Vision and Pattern Recognition*, 2000, vol. 1, pp. 464-471.

Munich, M.E., Perona, P., Continuous dynamic time warping for translation-invariant curve alignment with applications to signature verification, *Proc. of the 7th Inter. Conf. on Computer Vision*, (*ICCV'99*), 1999, pp. 108-115.

Plamondon, R., A. Alimi, P. Yergeau, and F. Leclerc. Modelling velocity profiles of rapid movements: A comparative study. *Biological Cybernetics*, 1993, 69(2):119-128.

Plamondon, R. and W. Guerfali, Why handwriting segmentation can be misleading, *Proc. of the 13$^{th}$ Int. Conf. on Pattern Recognition*, Vienne, Autriche, Aug. 25-30, 1996, vol. D, pp. 396-400.

Plamondon, R. and F. J. Maarse. An evaluation of motor models of handwriting. *IEEE Trans. on Syst. Man Cybernetic*, Sep. 1989, 19(5):1060-1072.

Procter, S., Illingworth, J., Mokhtarian, F., Cursive handwriting recognition using hidden Markov models and a lexicon-driven level building algorithm, *IEEE Proc. Vis. Image Signal Process.* (*VISP*), 2000, vol. 147, No. 4, pp. 332-339.

Singer, Y. and Tishby, N., Dynamical encoding of cursive handwriting. *Biological Cybernetics*, 1994, vol. 71, pp. 227-237.

Srihari, S. N., S. Cha, H. Arora, and S. Lee, Individuality of handwriting: A validation study, *Sixth International Conference on Document Analysis and Recognition* (*ICDAR '01*), Sep. 10-13, 2001, Seattle, Washington, pp. 106-109.

Wang, J., C. Wu, Y. Xu, H. Shum, L. Ji, Learning based cursive handwriting synthesis, *Eighth International Workshop on Frontiers in Handwriting Recognition* (*8th IWFHR*), Niagara-on-the-Lake, Ontario, Canada, Aug. 6-8, 2002.

\* cited by examiner

| METHOD | RECOGNITION RATE | | SEGMENTATION RATE |
|---|---|---|---|
| | INDIVIDUAL CHARACTER | CURSIVE SCRIPT | |
| RECOGNITION ENGINE | 56.1% | 70.5% | ---- |
| LOW-LEVEL | 93.7% | 46.5% | 69.1% |
| TWO-LEVEL | 95.2% | 71.9% | 81.3% |

TABLE 1

*hand* { UNCONNECTED SYNTHESIZED CHARACTERS

FIG. 14A

*hand* { CONNECTING CHARACTERS DIRECTLY

FIG. 14B

*hand* { CONNECTION BY DEFORMING CHARACTERS

FIG. 14C

*hand* { CONDITIONAL SAMPLING SYNTHESIS

FIG. 14D

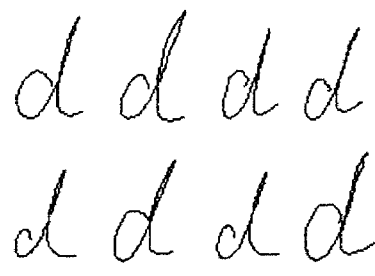
FIG. 15A — LETTER SEGEMENTED FROM HANDWRITING SAMPLE
FIG. 15B — LETTER SYNTHESIZED FROM TRAINED MODEL
FIG. 15C — LETTER SEGEMENTED FROM HANDWRITING SAMPLE
FIG. 15D — LETTER SYNTHESIZED FROM TRAINED MODEL

*pendant* { INITIALLY SAMPLED LETTERS

FIG. 16A

*pendant* { AFTER FIRST ITERATION

FIG. 16B

*pendant* { AFTER SECOND ITERATION

FIG. 16C

*pendant* { FINAL RESULT

FIG. 16D

*ape* { INITIALLY SAMPLED LETTERS

FIG. 18A

*ape* { AFTER FIRST ITERATION

FIG. 18B

*ape* { AFTER SECOND ITERATION

FIG. 18C

*ape* { FINAL RESULT

FIG. 18D

{ HANDWRITING SAMPLE OF A FIRST USER

FIG. 20A

{ SYNTHESIZED HANDWRITING STYLE OF THE FIRST USER

LEARNING-BASED SYSTEM AND PROCESS FOR SYNTHESIZING CURSIVE HANDWRITING

TECHNICAL FIELD

The present invention relates in general to handwriting synthesis and analysis and more particularly to a learning-based process and system for synthesizing the cursive handwriting of a user's personal handwriting style by combining shape models and physical models.

BACKGROUND OF THE INVENTION

Pen-based computing devices (such as pen computers, Tablet PCs and personal digital assistants (PDAs)) are becoming increasingly popular among consumers. Pen-based computing devices utilize an electronic pen (called a stylus) instead of keyboard for input. Pens are used for input because in many situations the computing devices are too small to incorporate a keyboard. In addition, there are numerous situations where a pen together with a notepad is more convenient for the user that a keyboard. These pen-based computing devices generally have special operating systems that support handwriting recognition, which allows a user to interface with the device by writing on a screen or on a tablet instead of typing on a keyboard.

The flourish of pen-based computing devices has created a demand for various handwriting computing techniques. In general, these handwriting computing techniques can be divided into two categories, namely, handwriting recognition and handwriting modulation. Handwriting recognition techniques make it possible for a computer to recognize characters and other symbols written by hand. Most pen-based computing devices incorporate some type of handwriting recognition features. Handwriting modulation includes features like handwriting editing, error correction and script searching.

Handwriting modulation also includes handwriting synthesis. Using handwriting synthesis techniques affords a pen-based computing device several important and useful features. For example, handwriting synthesis techniques can be used to automatically correct a user's writing or spelling errors when using handwriting as input to a pen-based computing device. In addition, handwriting synthesis techniques allow the use of personalized fonts, such as a font of the user's personalized handwriting. Moreover, in many situations people prefer handwriting to typed text because it adds a personal touch. For example, most people prefer to receive and send handwritten personal letters, thank-you notes, greetings, and compliments. Handwriting is used by advertisers to attract the attention of customers. Many people, however, find it easier and more efficient to use a keyboard rather than handwriting. This may be because typing is faster than handwriting or because a person's handwriting is illegible. Thus, in order to personalize the communication yet allow a user to type, it is desirable to be able to convert printed text into the cursive handwriting of the user.

There are a number of approaches that have been used to model and synthesize handwriting. Generally, these approaches can be divided into two categories according to their principles: (a) movement-simulation techniques; and (b) shape-simulation methods. Movement-simulation approaches are physically-based approaches that mimic the pen tip movement of handwriting. Movement-simulation approaches are based on motor models, such as discussed in a paper by R. Plamondon and F. Maarse entitled "An evaluation of motor models of handwriting", in IEEE Trans. PAMI 19 (5) (1989), pp. 1060-1072. These motor models, which attempt to model the process of handwriting production (or the writing process of the human hand), depend on the dynamic information of handwriting. In a paper by Y. Singer and N. Tishby entitled "Dynamical encoding of cursive handwriting", in Proc. IEEE Conf. CVPR, 1993 and a paper by H. Chen, O. Agazzi and C. Suen entitled "Piecewise linear modulation model of handwriting", in Proc. $4^{th}$ Int'l Conf. Document Analysis and Recognition, Ulm, Germany, 1997, pp. 363-367, modulation models were used to model and represent the velocity of handwriting trajectory. A delta log-normal model was described in a paper by R. Plamondon, A. Alimi, P. Yergeau and F. Leclerc entitled "Modeling velocity profiles of rapid movements: a comparative study", in Biological Cybernetics, 69 (1993), pp. 119-128. This delta log-normal model was used in a paper by X. Li, M. Parizeau and R. Plamondon entitled "Segmentation and reconstruction of on-line handwriting scripts" in Pattern Recognition 31 (6) (1998), pp. 675-684, for handwritten script compression. Each of these approaches, however, focused on the representation and analysis of real handwriting signals, rather than on the handwriting synthesis. This is because motor models cannot directly be used to synthesize the novel handwriting or user's style, especially in the cursive case.

Shape-simulation approaches only consider the static shape of handwriting trajectory. Shape-simulation approaches, which are based on geometric models, attempt to synthesize curves that are similar to the original handwriting trajectories. These approaches are more practical than movement-simulation techniques when the dynamic information of handwriting samples is not available. In addition, the shape-simulation approaches are more practical when the handwriting trajectory has been re-sampled by other processors (such as recognizers). This is discussed in a paper by H. Beigi entitled "Pre-processing the dynamics of on-line handwriting data, feature extraction and recognition", in Proc. of the Fifth Int'l Workshop on Frontiers of Handwriting Recognition, Colchester, England, 1996. A straightforward shape-simulation approach is proposed in a paper by 1. Guyon entitled "Handwriting synthesis from handwritten glyphs", in Proc. of the Fifth Int'l Workshop on Frontiers of Handwriting Recognition, Colchester, England, 1996. In this approach by Guyon, handwriting was synthesized from collected handwriting glyphs. Each glyph was a handwriting sample of two or three letters. When synthesizing a long word, this approach simply juxtaposed several glyphs in sequence and did not connect them to generate fluid handwriting. In fact, none of these approaches is capable of synthesizing fluid cursive handwriting in the personal style of a user.

Therefore, there exist a need for a cursive handwriting synthesis system and process capable of mimicking a user's personal handwriting style and reproducing that style such that the synthesized handwriting produced is fluent and natural and an accurate reproduction of the user's personal handwriting style.

SUMMARY OF THE INVENTION

The invention disclosed herein includes a process and a system for synthesizing the personal cursive handwriting style of a user. The approach is learning-based, which means that handwriting samples of the user are collected and used as a basis for synthesis. The process and system synthesize a user's unique handwriting style by carefully imitating and preserving the shape of letters as written by the user in a handwriting sample. In addition, the connection between individual letters of a word are smooth and natural to produce a fluent cursive script that is an accurate reproduction of the user's personal handwriting style.

In order to achieve this high-performance in handwriting synthesis, the learning-based cursive handwriting synthesis process and system takes advantage of the shape-simulation and the movement-simulation approaches. In general, handwriting samples are collected from a user and then segmented into individual characters using a two-level writer-independent segmentation technique. First, the handwriting strokes of the same character are automatically matched and aligned. Next, the shape variation of the training set is learned by a Principal Component Analysis PCA model. In the synthesis process, the delta log-normal model is used along with a conditional sampling technique. This conditional sampling technique is capable of selectively generating novel letters from models and then connecting them smoothly with other letters in a word in order to produce from the model fluent, natural handwriting in the user's personal style.

The handwriting synthesis system and process disclosed herein uses a handwriting sample in a user's handwriting style to train and create models of the characters contained in the handwriting sample. Using these models, the user's handwriting style can be synthesized. In addition, the synthesized characters are connected in a smooth, fluid and natural fashion to provide an excellent representation of the user's handwriting style. By way of example, this allows input typed text to be rewritten in the user's handwriting style.

In general, the handwriting synthesis process includes receiving a handwriting sample from a user in the user's handwriting style, segmenting the handwriting sample is segmented into individual characters, and generating a learned model generated for each of the individual characters. The method also includes using the models to synthesize handwritten text that mimics the user's handwriting style.

Specifically, the handwriting synthesis process includes a segmentation process that segments a handwriting sample into individual characters. The segmentation process is a two-level writer-independent process that uses a level-building segmentation framework. A script code that unique defines a trajectory of individual characters is used as a middle-level feature in the two-level segmentation process. Using a level-building framework, segmentation and recognition are merged to give optimal segmentation results. Moreover, a writer-independent segmentation is achieved by building and using a large handwriting database. The segmentation process builds a handwriting database, is used to train the segmentation process, and a script code is calculated from the handwriting sample. The script code may include key points on the handwriting data, such as crossing points of lines of a letter and maximum or minimum height of the letter. Next, a distance between script codes then is determined, and, based on the distance, similar character samples are clustered together, and training samples for each individual character are obtained.

The handwriting synthesis process also includes a learning process for training and building models for each separate handwritten character in the handwriting sample. This is achieved by matching the segmented character samples using a hierarchal process. Models for each individual characters are generated by learning the shape characteristics of each individual character sample and determining statistical parameters of the shape characteristics. The learning process includes decomposing a trajectory of the training samples into static strokes, extracting point vectors from the training samples, and aligning the point vectors in a common coordinate frame to form a distribution of aligned point vectors. The point vectors may be aligned using an iterative alignment approach. The learning process also includes modeling individual characters by learning the shape characteristics of each character sample using statistical analysis and learning the parameters for the shape characteristics. The shape characteristics may be learned by using principal component analysis (PCA).

The handwriting synthesis process also includes a synthesis process for synthesizing characters from the models and connecting adjacent synthesized characters to form words. The synthesis process includes selecting the desired text and the associated models, placing each synthesized character in proper sequence, and aligning the baseline of each synthesized character. In addition, the synthesis process includes joining or connecting the synthesized characters with neighboring characters as necessary to form fluid text and words in the user's synthesized handwriting. This connection is performed under the effects and constraints of the character's neighbors. In particular, connection occurs by calculating a concatenation energy of synthesized character pairs, calculating a sampling energy of the synthesized character pairs, and defining a total energy that includes the concatenation energy and the sampling energy. Next, the total energy is minimized to determine a point of connection between synthesized character pairs.

The handwriting synthesis system disclosed herein makes use of the process described above. In general, the handwriting synthesis system includes a segmentation module that segments a handwriting sample into individual characters, a learning module that builds models of each separate handwritten character in the handwriting sample, and a synthesis module that synthesizes handwriting using the models.

Specifically, the segmentation module of the handwriting synthesis system includes a handwriting database generator that generates a handwriting database, a script code calculator that calculates script codes for the handwriting sample and extracts key points of the handwriting sample, a script code distance module that divides samples of each individual character in the handwriting sample into several clusters based on the distance between script codes, and a clustering module that clusters the samples of each individual character having similar characteristics (such as shape characteristics) into a single cluster.

The learning module of the handwriting synthesis system includes an alignment module that takes training samples and normalizes and aligns point vectors for each training sample, and a modeling module that takes the aligned point vectors and uses statistical analysis to learn shape characteristics of each individual character. The alignment module includes a decomposition module that decomposes the trajectory of a training sample into static strokes, a point vector extractor that takes the decomposition and extracts a point vector for the training sample, and a point vector aligner that aligns the extracted point vectors using an iterative alignment approach to form a distribution of aligned point vectors. The modeling module includes a shape characteristics module that models the distribution of aligned point vectors by learning the shape characteristics of the individual characters using statistical analysis (such as a principal component analysis (PCA). The modeling module also includes a statistical parameter module that learns the parameters for the shape characteristics. These parameters then are used to build models of individual characters.

The synthesis module of the handwriting synthesis system includes a selection module that selects the desired characters from the models of individual characters, a baseline alignment module that places these characters in proper sequence and aligns the baselines of the characters, and a concatenation module that joins the characters with neighboring characters as necessary to form text and words of synthesized handwriting. The concatenation module includes a concatenation energy module that calculates a concatenation energy of a word consisting of synthesized characters or synthesized character pairs, a sampling energy module that calculates a sampling energy to ensure that the deformed synthesized character is consistent with the model of that individual character, and a energy minimization module that minimizes a total energy of the combined concatenation and sampling energies to determine a point of connection of the synthesized character to its neighbors.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout:

FIGS. 14A-D illustrate a comparison between traditional connection approaches and the conditional sampling synthesis performed by the handwriting synthesis system and method.

FIGS. 15A-D illustrate a comparison between synthesized letters from the trained models and letters segmented from the training data.

FIGS. 16A-D illustrate results from synthesizing the word "pendant".

FIGS. 18A-D illustrate results from synthesizing the word "axe".

FIGS. 20A-B illustrate an example of a handwriting sample of a first user and the handwriting style of the first user synthesized by the handwriting synthesis system and method.

FIGS. 21A-B illustrate an example of a handwriting sample of a second user and the handwriting style of the second user synthesized by the handwriting synthesis system and method.

Table 1 illustrates results from one-level and two-level approaches.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

Handwriting synthesis has many important applications to facilitate a user's work and personalize the communication on pen-based computing devices. The handwriting synthesis system and method described herein addresses the problem of learning the personal handwriting style of a user based on limited handwriting samples and producing novel scripts of the same style. Initially, cursive handwriting samples are segmented into individual characters by a two-level writer-independent segmentation process. Samples of the same character are aligned into a common coordinate frame and learned by shape models. These learned models have the ability to generate shapes similar to those in the training set. Synthesis of cursive script is performed by generating individual letters from models and concatenating the letters using a conditional sampling algorithm. The result is a smooth and fluid connection between letters that successfully mimics the personal handwriting style of a user. The working examples have illustrated the effectiveness of the handwriting synthesis system and method.

Figure 1:
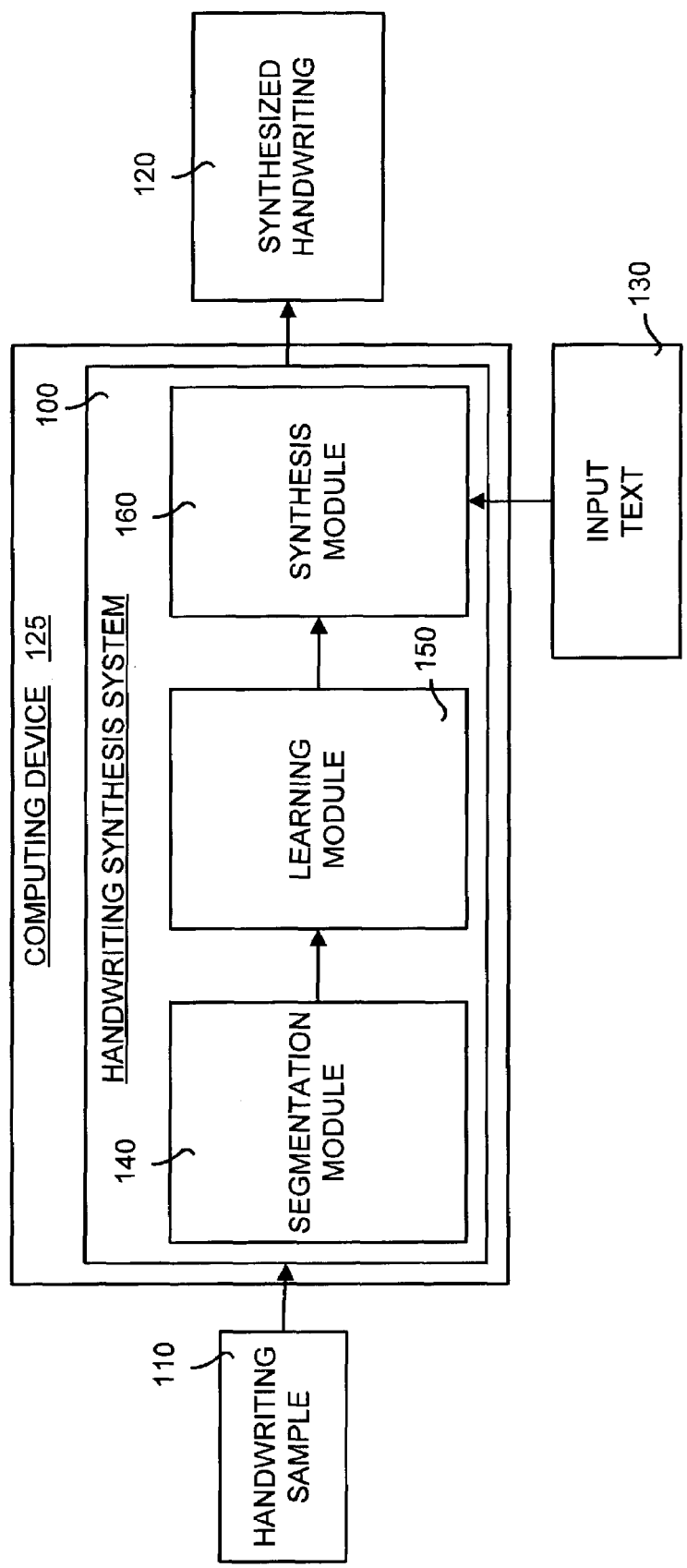
FIG. 1 is a block diagram illustrating a general overview of the handwriting synthesis system and method disclosed herein.

FIG. 1 is a block diagram illustrating a general overview of the handwriting synthesis system 100 disclosed herein. In general, the system 100 inputs a handwriting sample 110 and outputs synthesized handwriting 120. The handwriting synthesis system 100 generally resides on a computing device 125. As discussed below, this computing device may include a computer and typically contains a processor for executing computer-executable instructions.

The handwriting sample 110 typically contains a number of handwritten characters, such as letters, numbers, punctuation marks, as so forth. These handwritten characters typically make up a number of words that are contained in paragraphs. The handwriting sample 110 is in the personal handwriting of a user. The synthesized handwriting output 120 is a synthesized version of the user's handwriting. In general, the synthesized handwriting 120 contains the words or characters from an input text 130. The input text 130 may be in any form, such as, for example, typed text, handwritten text in another's handwriting or in the user's handwriting.

As shown in FIG. 1, the handwriting synthesis system 100 includes a segmentation module 140, a learning module 150, and a synthesis module 160. The segmentation module 140 segments the handwriting sample 110 into individual characters. Each individual characters is extracted individual characters from the handwriting sample 110 by the segmentation module 140.

The learning module 150 builds models of each separate handwritten character in the handwriting sample 110. These models, which are generally learned models, are built by analyzing the individual characters that were segmented and extracted from the handwriting sample 110 by the segmentation module 140. The synthesis module 160 synthesizes handwriting using the learned models. The synthesis module 160 uses the learned models to synthesize each handwritten characters and then connects the synthesized characters as needed to generate words in the in the user's handwriting.

II. Exemplary Operating Environment

The handwriting synthesis system and method disclosed herein is designed to operate in a computing environment. The following discussion is intended to provide a brief, general description of a suitable computing environment in which the handwriting synthesis system and method may be implemented.

Figure 2:
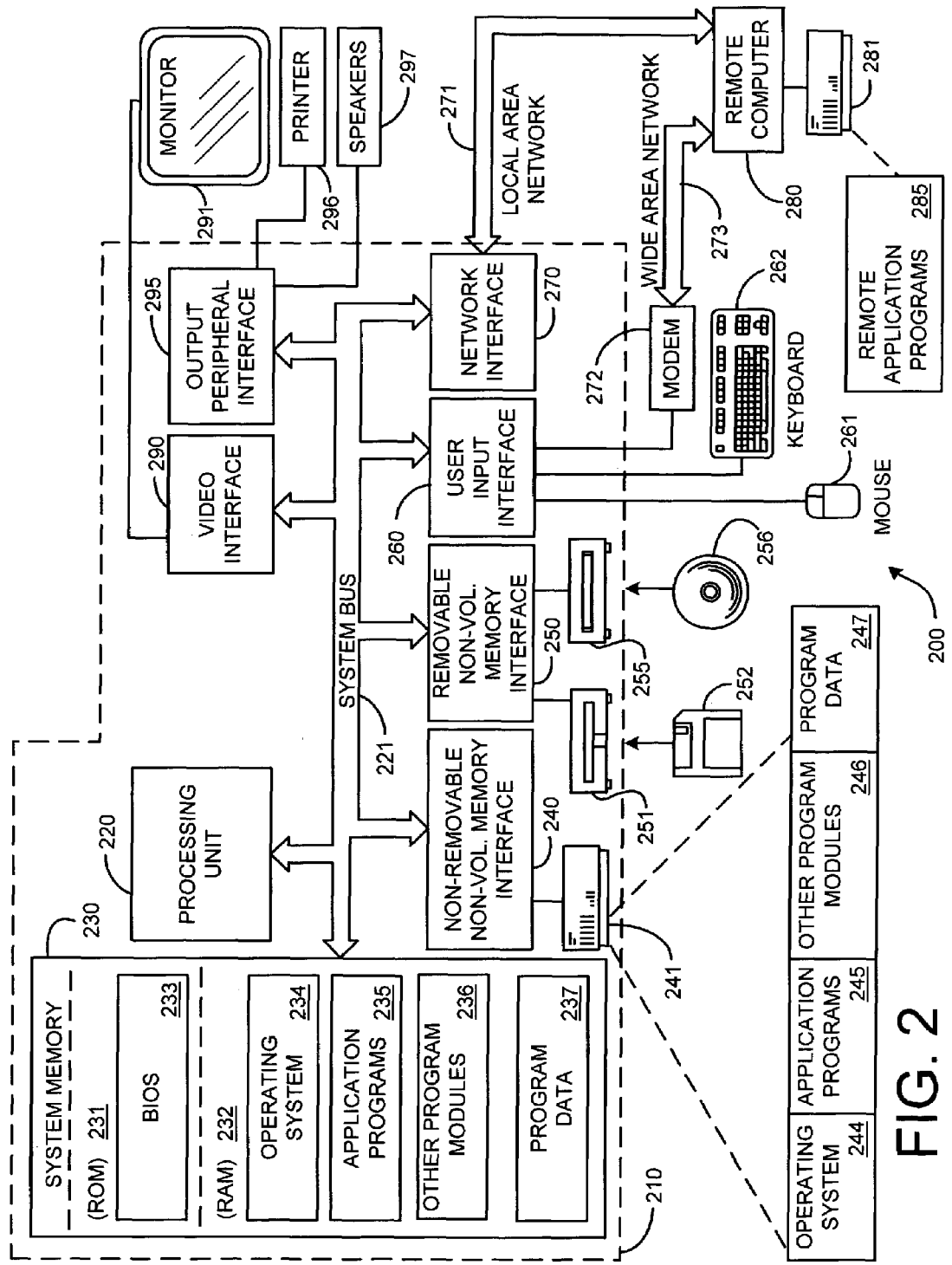
FIG. 2 illustrates an example of a suitable computing system environment in which the handwriting synthesis system and method shown in FIG. 1 may be implemented.

FIG. 2 illustrates an example of a suitable computing system environment 200 in which the handwriting synthesis system and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The handwriting synthesis system and method is operational with numerous other general purpose or special purpose computing system environments or configurations. Examples of well known computing systems, environments, and/or configurations that may be suitable for use with the handwriting synthesis system and method include, but are not limited to, personal computers, server computers, handheld, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The handwriting synthesis system and method may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the handwriting synthesis system and method includes a general-purpose computing device in the form of a computer 210 (the computer 210 is an example of the computing device 125 shown in FIG. 1).

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

III. System Components

As described in general above, the handwriting synthesis system 100 includes several components. These components allow the system 100 to synthesize the handwriting of a user. As noted above, the components of the system 100 include the segmentation module 140, the learning module 150, and the synthesis module 160. These modules and sub-components of these modules will now be discussed in detail.

Figure 3:
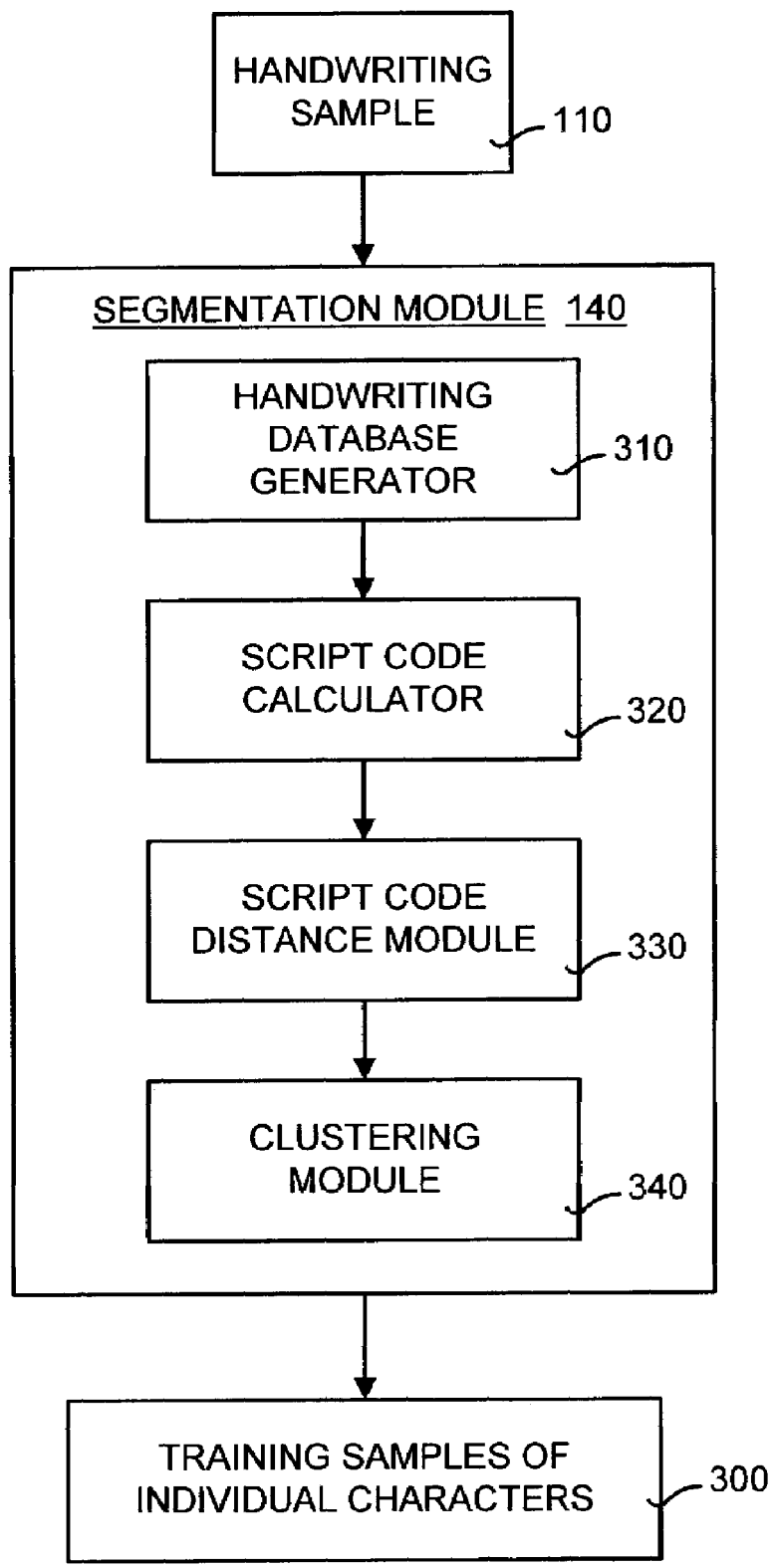
FIG. 3 is a block diagram illustrating the details of an exemplary implementation of the segmentation module shown in FIG. 1.

FIG. 3 is a block diagram illustrating the details of an exemplary implementation of the segmentation module 140 shown in FIG. 1. In general, the segmentation module 140 segments the handwriting sample 110 into individual characters and outputs training samples of the individual characters 300. As explained in detail below, these training samples 300 are used to train a separate model for each character. Segmentation is achieved by adopting a framework of level-building for handwriting segmentation. In a preferred embodiment, the framework is a two-level framework whereby segmentation and recognition are merged to provide an optimal results. The segmentation module 140 includes a handwriting database generator 310, a script code calculator 320, a script code distance module, and a clustering module 340.

The handwriting database generator 310 is used to generate a handwriting database (not shown). This database preferably contains a large number of words written by a variety of people. The script code calculator 320 calculates script codes for the handwriting sample 110. In addition, the script code calculator 320 extracts key points of the handwriting sample 110. The script code distance module 330 divides samples of each individual character in the handwriting sample 110 into several clusters based on the distance between script codes. The clustering module 340 clusters those samples of each individual character having similar characteristics (such as shape characteristics) into a single cluster. Each cluster represents a training sample of individual characters 300.

Figure 4:
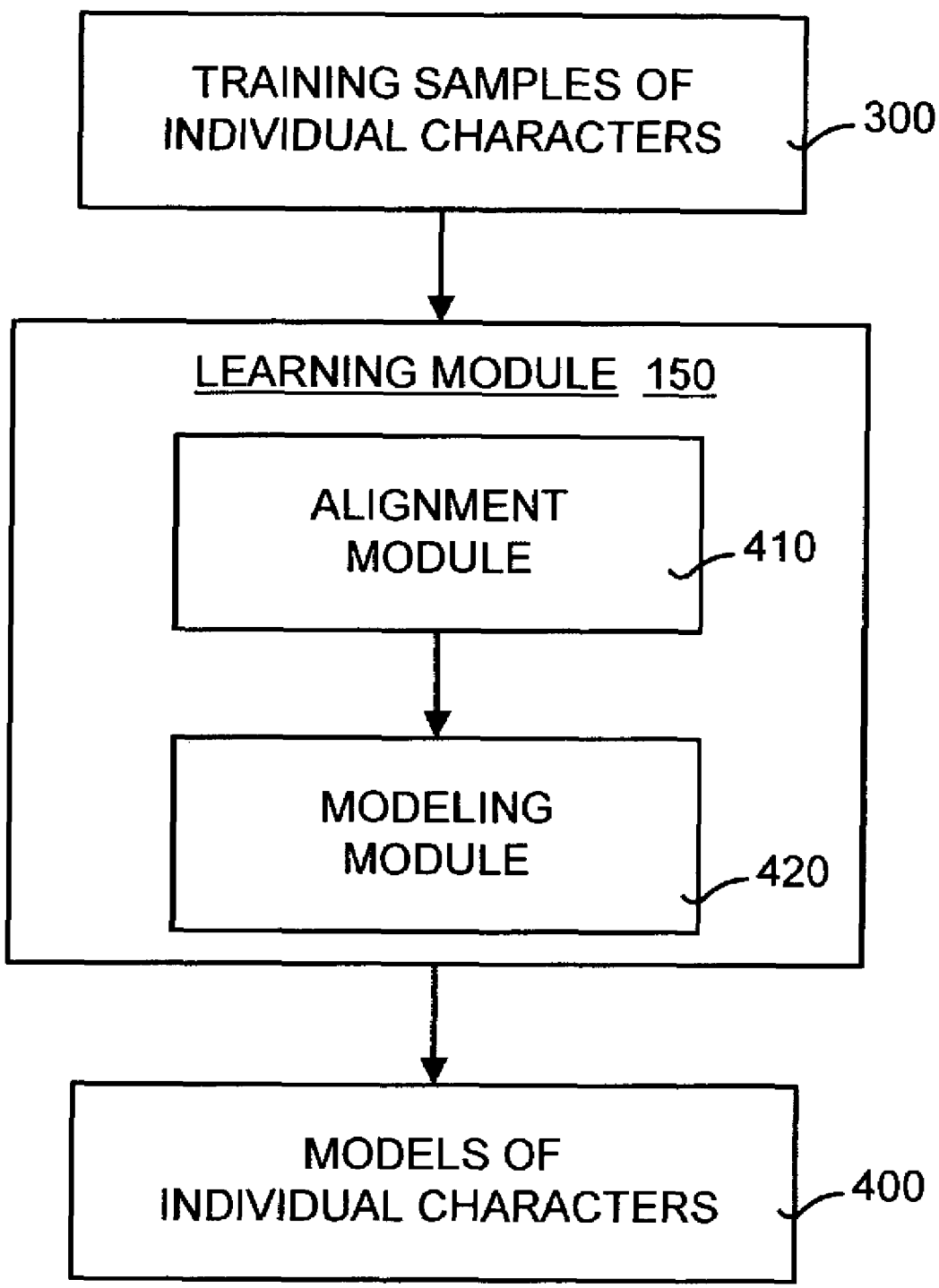
FIG. 4 is a block diagram illustrating the details of an exemplary implementation of the learning module shown in FIG. 1.

FIG. 4 is a block diagram illustrating the details of an exemplary implementation of the learning module 150 shown in FIG. 1. Generally, the learning module 150 trains and builds models for each separate handwritten character in the handwriting sample 110. These models, which are generally learned models, are built by analyzing the individual characters that were segmented and extracted from the handwriting sample 110 by the segmentation module 140. In particular, the learning module 150 includes an alignment module 410 and a modeling module 420. The alignment module 410 takes the training samples 300 and normalizes and aligns point vectors for each training sample. The modeling module 420 takes the aligned point vectors and, using statistical analysis, learns the shape characteristics of each individual character. Once statistical parameters of the shape characteristics are determined, learned models of the individual characters 400 are generated.

Figure 5:
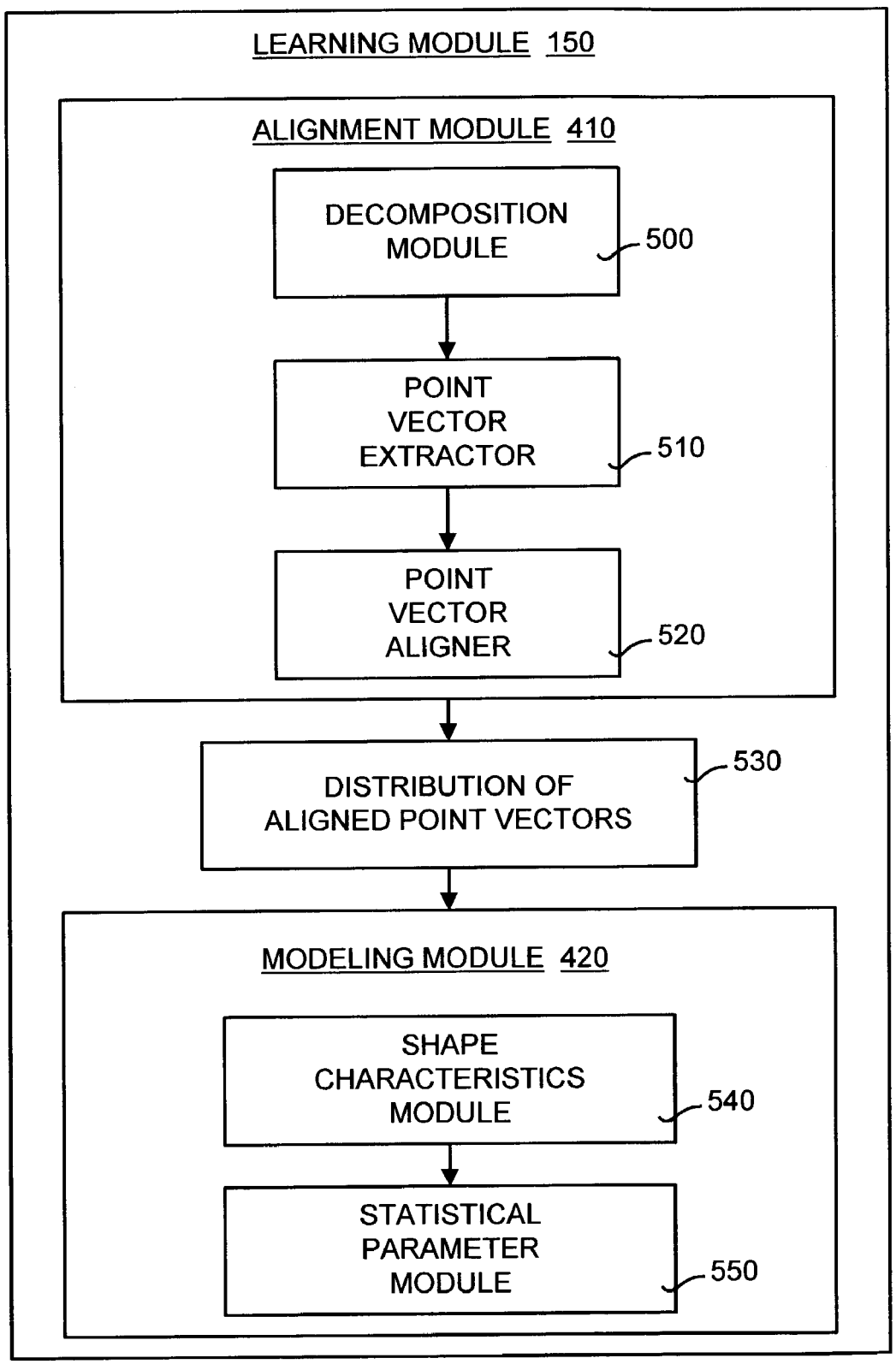
FIG. 5 is a block diagram illustrating further details of the alignment module and the modeling module shown in FIG. 4.

FIG. 5 is a block diagram illustrating further details of the alignment module 410 and the modeling module 420 shown in FIG. 4. The alignment module 410 includes a decomposition module 500, a point vector extractor 510 and a point vector aligner 520. The decomposition module 500 decomposes the trajectory of a training sample into static strokes. The point vector extractor 510 takes the decomposition and extracts a point vector for the training sample. The point vector aligner 520 aligns the extracted point vectors to form a distribution of aligned point vectors 530. In a preferred embodiment, the point vector aligner 520 uses an iterative statistical process or iterative alignment approach to align the point vectors.

The modeling module 420 includes a shape characteristics module 540 and a statistical parameter module 550. The shape characteristics module 540 in general models the distribution of aligned point vectors 530. Specifically, this is achieved by learning the shape characteristics of the individual characters using statistical analysis. In a preferred embodiment, principal component analysis (PCA) is used to determine these shape characteristics. The statistical parameter module 550 learns the parameters for the shape characteristics. The parameters are used to build models of individual characters 400.

Figure 6:
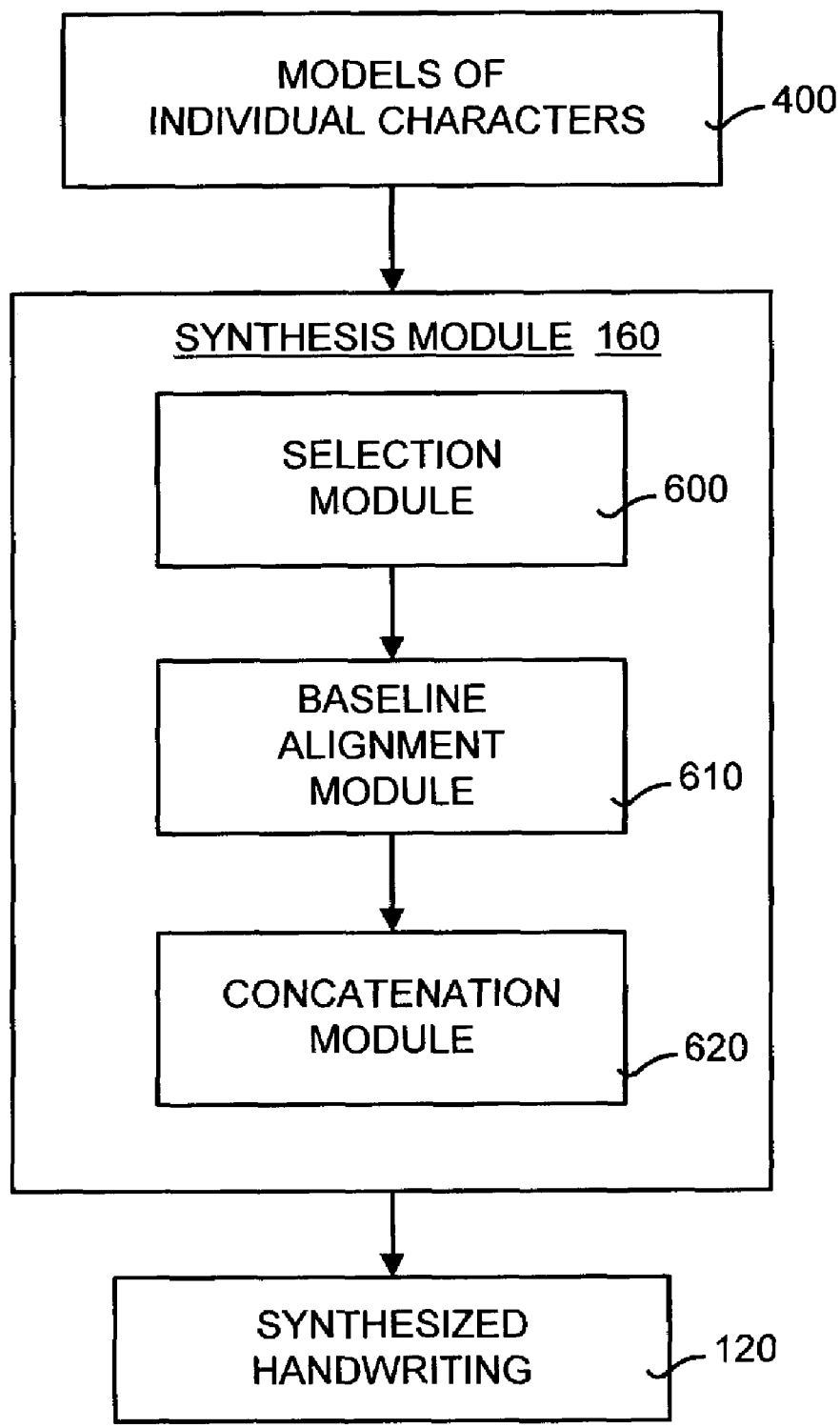
FIG. 6 is a block diagram illustrating the details of an exemplary implementation of the synthesis module shown in FIG. 1.

FIG. 6 is a block diagram illustrating the details of an exemplary implementation of the synthesis module 160 shown in FIG. 1. In general, the synthesis module 160 synthesizes separate characters in the handwriting style of a user using the learned models of individual characters 400. In addition, the synthesis module 160 connects the synthesized characters as needed to generate words in the in the user's handwriting in the form of the synthesized handwriting 120.

The synthesis module 160 includes a selection module 600, a baseline alignment module 610, and a concatenation module 620. The selection module 600 selects the desired characters from the models of individual characters 400. The baseline alignment module 610 then places these characters in proper sequence and aligns the baselines of the characters. The concatenation module 620 joins the characters with neighboring characters as necessary to form text and words of synthesized handwriting 120.

Figure 7:
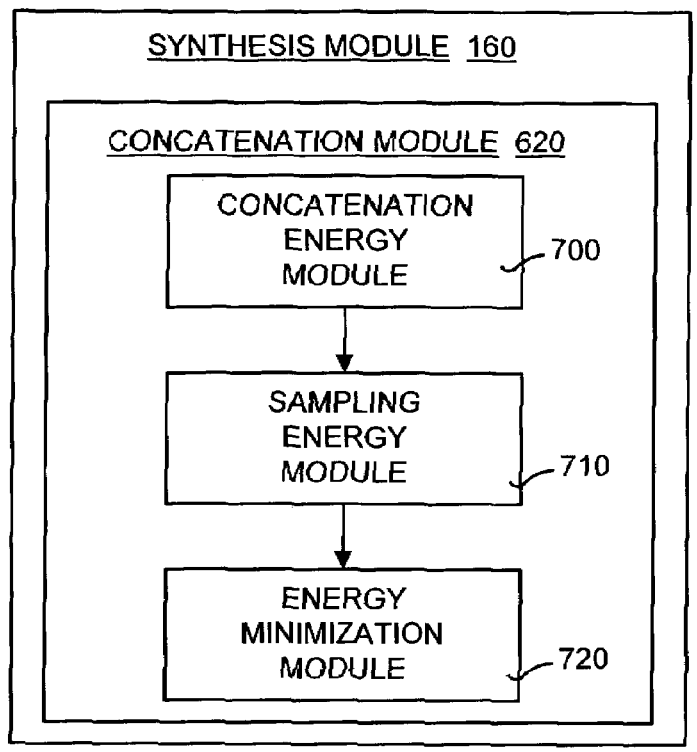
FIG. 7 is a block diagram illustrating further details of the concatenation module shown in FIG. 6.

FIG. 7 is a block diagram illustrating further details of the concatenation module 620 shown in FIG. 6. In general, the concatenation module connects neighboring synthesized characters to create fluid synthesized handwriting. This is achieved by generating each character from the models and connecting them under the effects and constraints of its neighbors. The concatenation module 620 includes a concatenation energy module 700, a sampling energy module 710, and a energy minimization module 720. The concatenation energy module 700 calculates a concatenation energy of a word consisting of synthesized characters or synthesized character pairs. The sampling energy module 710 calculates the sampling energy to ensure that the deformed synthesized character is consistent with the model of that individual character. The energy minimization module 720 minimizes the total energy of the combined concatenation and sampling energies to determine a point of connection of the synthesized character to its neighbors.

IV. Operational Overview

The handwriting synthesis system 100 disclosed herein uses the handwriting synthesis method described above to synthesize the personal handwriting style of a user. A learning-based approach is used, such that handwriting samples of the user are collected and used as a basis for synthesis. The process synthesizes a user's unique handwriting style by carefully imitating and preserving the shape of letters as written by the user in a handwriting sample. In addition, the connection between individual letters of a word are smooth and natural to produce a fluent cursive script that is an accurate reproduction of the user's personal handwriting style.

Figure 8:
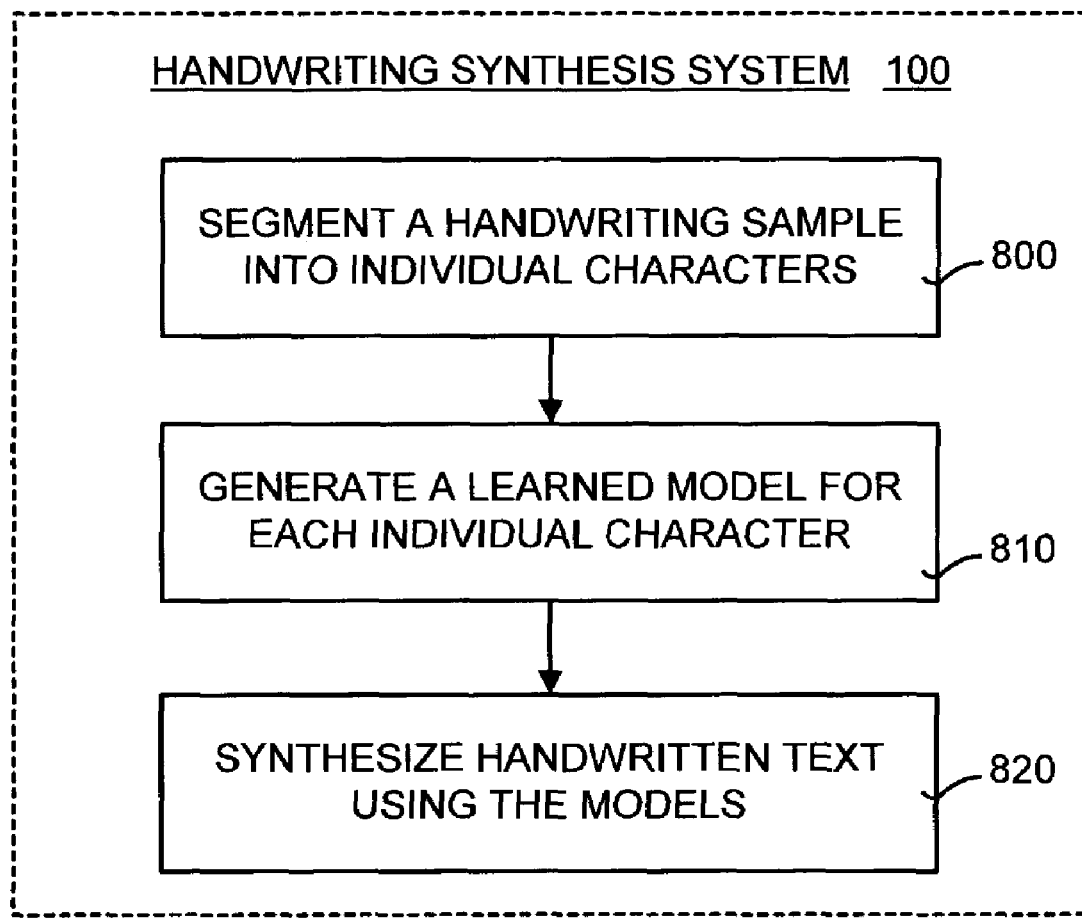
FIG. 8 is a general flow diagram illustrating the operation of the handwriting synthesis method of the handwriting synthesis system shown in FIG. 1.

FIG. 8 is a general flow diagram illustrating the operation of the handwriting synthesis method of the handwriting synthesis system 100 shown in FIG. 1. The method begins by receiving a handwriting sample from a user in the user's handwriting style. The handwriting sample is segmented into individual characters (box 800). A learned model is generated for each of the individual characters (box 810). Finally, the models are used to synthesize handwritten text that mimics the user's handwriting style.

V. Operational Details

Figure 9:
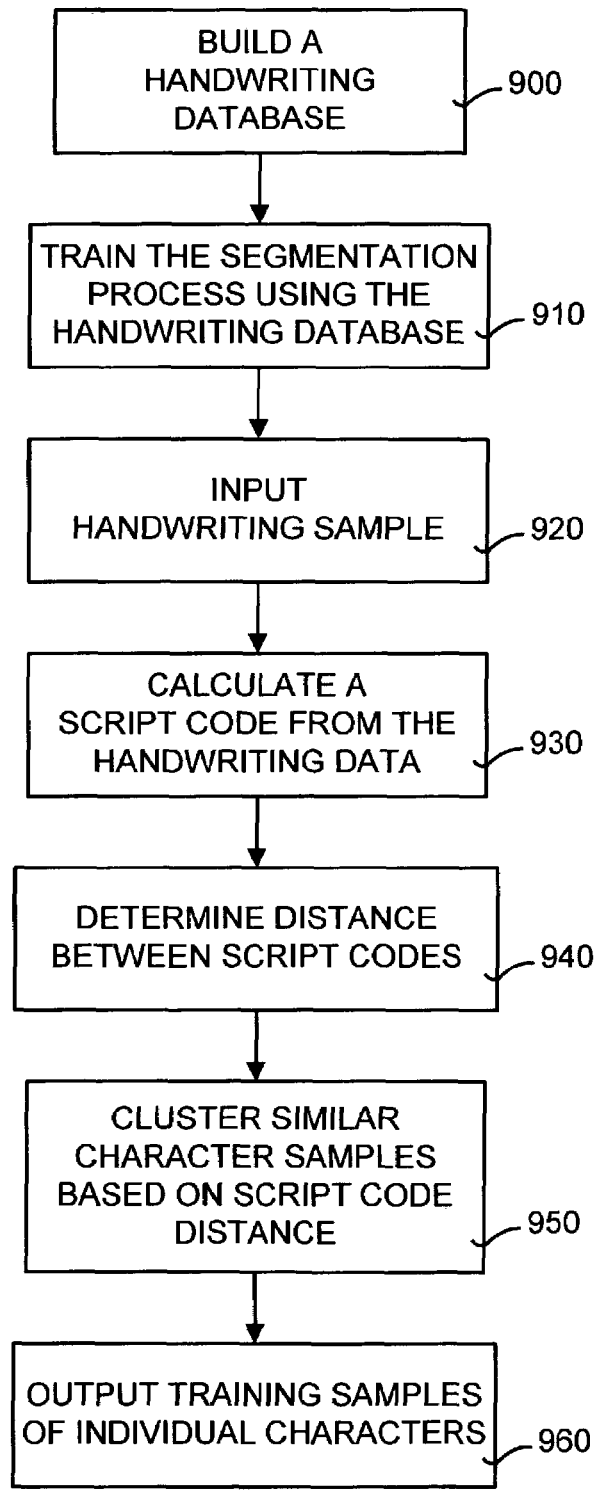
FIG. 9 is a detailed flow diagram illustrating the operation of the segmentation process for the handwriting synthesis method shown in FIG. 8.

FIG. 9 is a detailed flow diagram illustrating the operation of the segmentation process for the handwriting synthesis method shown in FIG. 8. In general, segmentation process segments a handwriting sample into individual characters. This means that each handwritten word is automatically segmented into isolated, separate characters before they are used to train the handwriting style models.

The segmentation process is a two-level writer-independent process that uses a level-building segmentation framework. Two-level segmentation greatly improves the segmentation ratio as compared with traditional one-level segmentation algorithms. Using the level-building framework, segmentation and recognition are merged to give optimal segmentation results. A writer-independent segmentation is achieved by building and using a large handwriting database. In addition, a script code is used as a middle-level feature for sub-class clustering.

The segmentation process begins by building a handwriting database (box 900). This database is used to train the segmentation process (box 910). Next, the handwriting sample is input (box 920). The handwriting sample is written by a user in his/her own handwriting style. In one embodiment, the handwriting sample involves about two-hundred (200) words in paragraphs. There are at least two criterion that the sample paragraphs of the handwriting sample should meet. First, the paragraphs should compose integrative sentences and not isolated words or glyphs. This is because the writing style of fluent sentences may be different from isolated words. Second, the appearance frequency of each character in the paragraphs should be consistent with the frequency of the character appearing in regular or standard documents (such as a book or letter).

A script code then is calculated from the handwriting data contained in the handwriting database (box 930). The script code is used to handle the large variances between different writing styles. Any character may be uniquely coded by means of a script code. The script code may include key points on the handwriting data, such as crossing points of lines of a letter and maximum or minimum height of the letter. A distance between script codes then is determined (box 940). Based on the distance, similar character samples are clustered together (box 950). For example, the handwritten letter "a" may appear several times in the handwriting sample, but be written slightly different each time such that each "a" has a slightly different script code. By clustering similar script codes, each of the "a"s will be clustered and resolved into a single training sample for the "a". Finally, the training samples for each individual character are sent as output (box 960).

Figure 10:
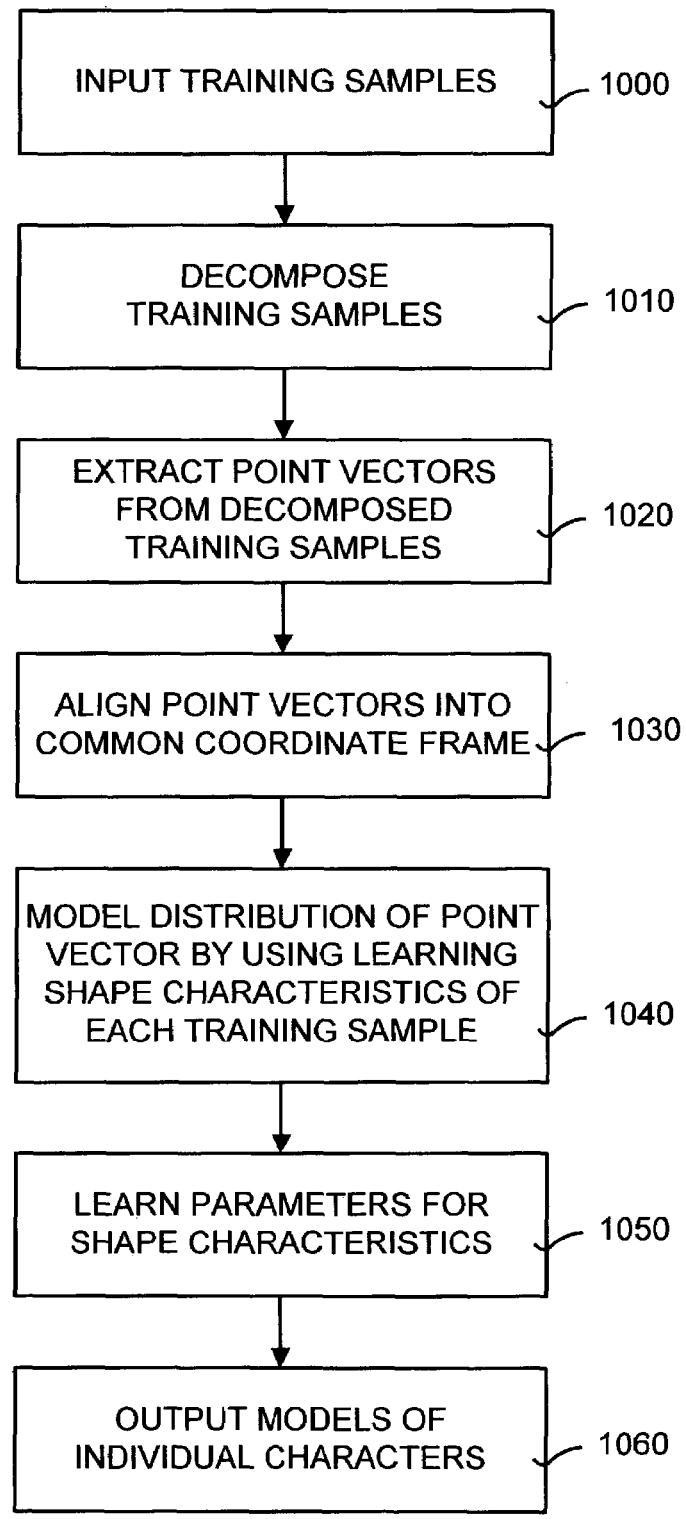
FIG. 10 is a detailed flow diagram illustrating the operation of the learning process for the handwriting synthesis method shown in FIG. 8.

FIG. 10 is a detailed flow diagram illustrating the operation of the learning process for the handwriting synthesis method shown in FIG. 8. In general, the learning process includes training and building models for each separate handwritten character in the handwriting sample. This is achieved by matching the segmented character samples using a hierarchal process. This includes aligning the each character sample and then using a statistical process to model the character samples. The model is generated by learning the shape characteristics of each individual character sample and determining statistical parameters of the shape characteristics.

Referring to FIG. 10, the learning process begins by inputting training samples generated by the segmentation process (box 1000). Next, the hierarchal process decomposes a trajectory of the training samples into static strokes (box 1010). Point vectors then are extracted from the training samples (box 1020). The point vectors are used to represent the character sample and includes the static strokes. The point vectors are aligned into a common coordinate frame to form a distribution of aligned point vectors (box 1030). In one embodiment, the point vectors are aligned using an iterative statistical process or iterative alignment approach.

The aligned point vectors form a distribution. This distribution is modeled by learning the shape characteristics of each character sample using statistical analysis (box 1040). In one embodiment, the shape characteristics are learned using principal component analysis (PCA). Next, the parameters for the shape characteristics are learned (box 1050). These parameters are used to build and output models of individual characters (box 1060).

Figure 11:
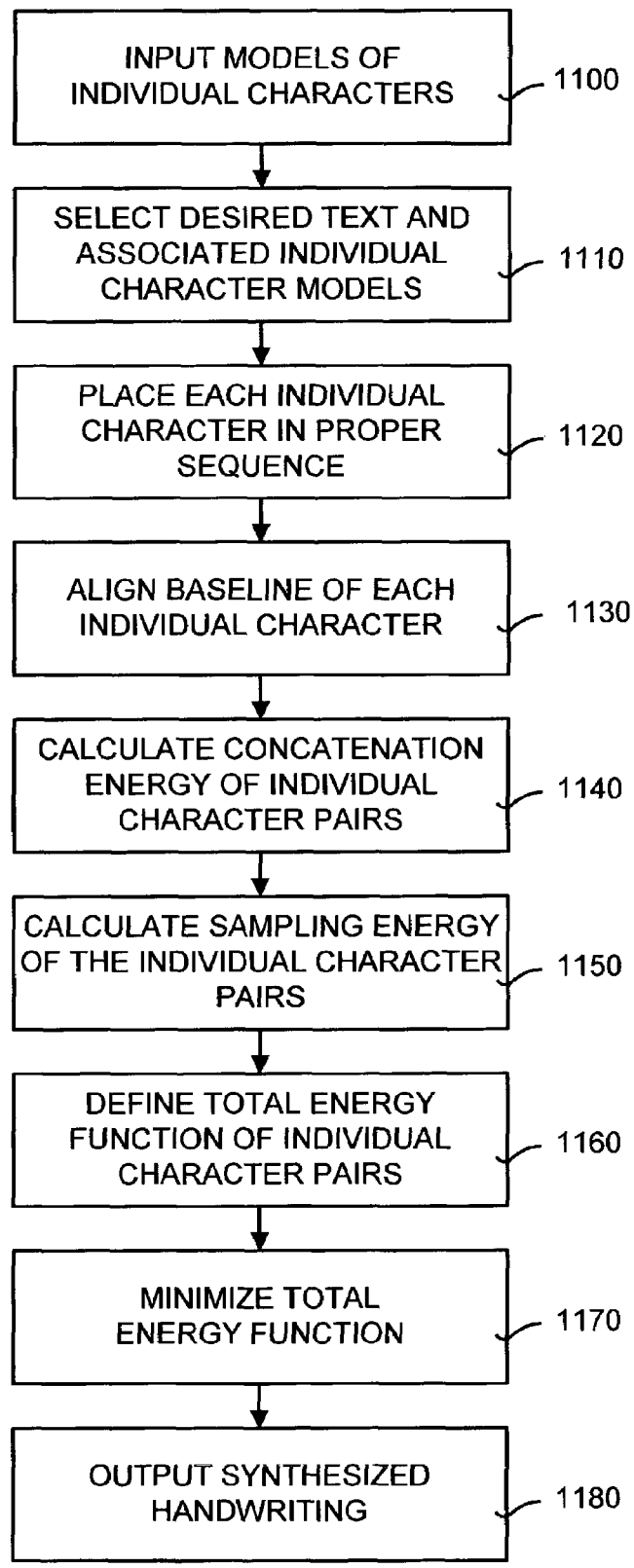
FIG. 11 is a detailed flow diagram illustrating the operation of the synthesis process for the handwriting synthesis method shown in FIG. 8.

FIG. 11 is a detailed flow diagram illustrating the operation of the synthesis process for the handwriting synthesis method shown in FIG. 8. In general, to synthesize a text (such as a word) using the synthesis process, the individual characters of the word first are generated from the models. Next, the synthesized characters are connected smoothly and naturally to imitate the fluid handwriting style of the user.

Referring to FIG. 11, the synthesis process begins by input the model of the individual characters (box 1100). The desired text and the associated models then are selected (box 1110). For example, if a word is being generated the letters of the word are selected. Each synthesized character is place in proper sequence (box 1120). The baseline of each synthesized character then is aligned (box 1130). Once the synthesized characters have been selected, arranged and aligned, the synthesis process joins or connects the synthesized characters with neighboring characters as necessary to form fluid text and words in the user's synthesized handwriting. Each character is connected under the effects and constraints of its neighbors.

In order to connect the synthesized characters, first the concatenation energy of the synthesized character pairs then is calculated (box 1140). The concatenation energy serves to guide the deformation process of the synthesized characters. In one embodiment, the concatenation energy is minimized to produce smooth and natural character connection. Although the concatenation energy can deform the characters to produce smooth connectivity between characters, another constraint is to ensure that the deformed characters are consistent with the individual character models. A sampling energy of the synthesized character pairs is calculated to achieve this consistency (box 1150). A total energy is defined and includes the concatenation energy and the sampling energy (box 1160). The total energy then is minimized (box 1170) to determine a point of connection between the synthesized character pairs (or adjacent synthesized characters). This connection produces output synthesized handwriting (box 1180) that is connected under the effects and constraints of its neighbors is fluid and smoothly connected.

VI. Working Example

In order to more fully understand the handwriting synthesis method disclosed herein, the operational details of an exemplary working example are presented. It should be noted that this working example is only one way in which the handwriting synthesis process may be implemented.

The working example used a personal computer and the handwriting trajectory was collected from a graphical tablet. The handwriting synthesis system and method were evaluated on handwriting samples written by 15 people. For each user, models were trained to capture the characteristics of each user's personal handwriting style.

Sample Collection and Segmentation

Sample Collection

For an initial user, he or she is required to write some sample paragraphs to train the handwriting models. In this working example, the handwriting sample paragraphs had about 200 words and each letter of the alphabet appeared more than five times. In a preprocessing step, the handwriting sample was passed through a low-pass filter and then resampled to produce equidistant points. Since a separate model is trained for each letter, the handwritten letters were extracted from these cursive scripts using the cursive handwriting segmentation process that will now be described.

Sample Segmentation

Overview

In general, there are three categories of methods for handwriting segmentation. These categories and methods are described by R. G. Casey and E. Lecolinet in a paper entitled "A survey of methods and strategies in character segmentation" in IEEE Trans. PAMI 18 (7) (1996), pp. 690-706. One is the segmentation-based recognition method, which uses some local hints, such as the points of maximum curvature, to oversegment the handwriting trajectories. Then a recognition engine analyzes these segments and estimates which segments should be grouped to output a character. Another approach, named recognition-based segmentation, is devised in an inverse manner whereby segmentation points are given by the recognizer after recognition. These two methods rely heavily on the performance of the recognition engine. A third method is a level-building framework, which simultaneously outputs the recognition and segmentation. This level-building approach is described by S. Proctor, J. Illingworth and F. Mokhtarian in a paper entitled "Cursive handwriting recognition using hidden markov models and a lexicon-driven level building algorithm" in IEE Proceeding-Vis. Image Signal Process 147 (4) (2000), pp. 332-339.

In this working example, although the paragraphs written by the user are known, the recognition problem still exists.

This is because the user may write several strokes for a word and the content of each stroke is unknown. To avoid propagating recognition error to segmentation, the handwriting synthesis system and process use the framework of level-building for handwriting segmentation. In the level-building framework, segmentation and recognition are merged to provide optimal results.

Two-Level Framework

Firstly, a formal description of the framework of traditional handwriting segmentation approaches will be given. Let $S=\{z_1, \ldots, z_T\}$ be a temporal handwriting sequence, where $z_T$ is a low-level feature that denotes the coordinate and velocity of the sequence at time t. The segmentation problem is to find an identity string $\{I_1, \ldots, I_n\}$ with the corresponding segments of the sequence $\{S_1, \ldots, S_n\}$, $S_1=\{z_1, \ldots, z_{t1}\}, \ldots, S_n=\{z_{t(n-1)+1}, \ldots, z_T\}$, that best explain the sequence, $$\{I_1^*, \ldots, I_N^*\} = \text{argmax} p(S_1, \ldots, S_n | I_1, \ldots, I_n) p(I_1, \ldots, I_n) \quad (1)$$

$$= \text{argmax} p(I_1) p(S_1 | I_1) \prod_{i=2}^{n} p(S_i | I_i) p(I_i | I_{i-1})$$

where it is assumed that each segment $S_i$ is conditionally independent of other variables given the corresponding identity $I_i$. Usually, Hidden Markov Models (HMMs) or neural networks are trained to get the likelihood $p(S_i|I_i)$. In this working example, a HMM-based segmentation algorithm was implemented under this framework for testing and comparison.

For the training of the writer-independent segmentation system, a large handwriting database was built. This handwriting database includes about 100,000 words written by more than 100 people. In general, the low-level feature based segmentation approach described above works well for a small number of writers. However, as more and more writing styles are involved, the approach degrades rapidly in capturing the variance of distinctly different handwriting styles. For effective handling of the dramatic variance between different handwriting styles, a script code was calculated from handwriting data as the middle-level feature for sub-class clustering.

Five kinds of key points on the handwriting sequence were extracted: points of maximum and minimum x coordinate, points of maximum and minimum y coordinate, and crossing points, denoted as:

$X^+, X^-, Y^+, Y^-$ and $\circledcirc$ respectively. The average direction of the interval sequence between two adjacent key points were calculated and quantized to eight directions, denoted as:

Figure 12:
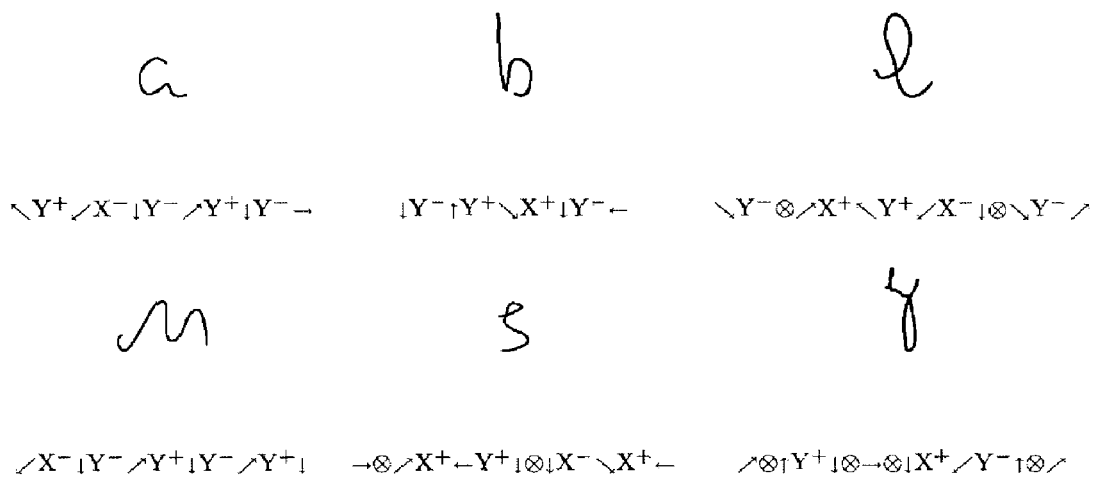
FIG. 12 illustrates examples of the script codes of some handwriting characters used in a working example.

Any character can be uniquely coded by means of this notation. FIG. 12 illustrates examples of the script codes of some handwriting characters used in this working example. Based on the distance between script codes, samples of each character are divided into several clusters, with those in the same cluster having similar structural topology.

Figure 13:
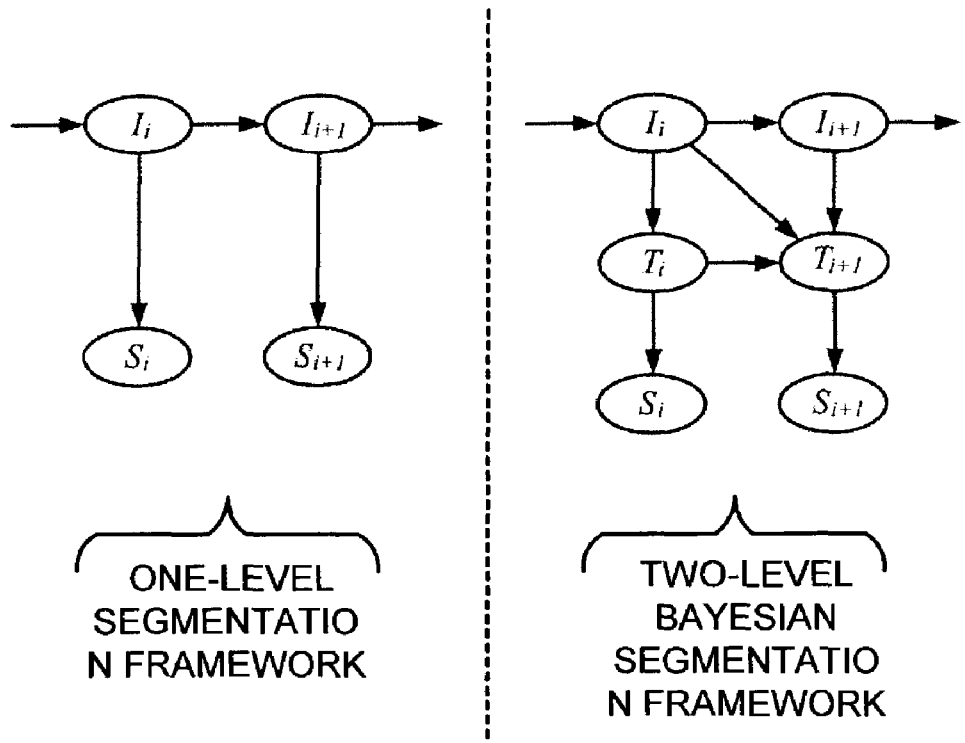
FIG. 13 illustrates a graph model comparison between the traditional one-level framework and the two-level Bayesian framework used by the handwriting synthesis system and process.

After introducing the middle-level features, the optimization problem becomes:

$$\{I_1^*, \ldots, I_n^*\} = \text{argmax} p(S_1, \ldots, S_n | I_1, \ldots, I_n) p(I_1, \ldots, I_n) \quad (2)$$

$$= \text{argmax} p(S, T | I_1, \ldots, I_n) p(I_1, \ldots, I_n)$$

$$= \text{argmax} p(I_1) p(T_1 | I_1) p(S_1 | T_1, I_1)$$

$$\prod_{i=2}^{n} p(I_i | I_{i-1}) p(T_i | I_i, T_{i-1}, I_{i-1}) p(S_i | T_i, I_i)$$

where T represents the script code. FIG. 13 illustrates a graph model comparison between the traditional one-level framework and the two-level Bayesian framework used by the handwriting synthesis system and process. In a pruning level-building architecture, introducing the script code T not only improves the accuracy of segmentation but also dramatically reduces the computational complexity of level-building.

Results

Both the one-level and the two-level approaches were tested on a separate test set. Segmentation points given by these approaches were checked manually to determine whether they were true or false. The results are listed in Table 1. For comparison, the results of a standard recognition engine is also listed. It is clear from Table 1 that the two-level algorithm greatly improves the recognition and segmentation ratio, as compared to traditional low-level algorithms. Furthermore, when do on-line segmentation in the handwriting synthesis system and method, the word written by the user is known and this information can be used as an additional constraint. By doing this, a correct segmentation ratio of about 86% can be achieved in practical use.

As agreed by researcher, it is impossible to achieve a correct ratio of 100% for handwriting recognition and segmentation. Given the fact that there is always a severe problem of erroneous labels being attached to handwriting trajectories, some interactive scenarios also have been employed in the handwriting synthesis system and method disclosed herein. For example, when the user is writing samples, the segmentation points are automatically computed and displayed on the handwriting trajectories of finished words and the user is allowed to make manual adjustments. Given the promising segmentation result of this system and method, the instances where manual adjustment is necessary are dramatically diminished.

Learning Strategies

Character samples were segmented from cursive handwriting samples using the methods described above. These character samples then were collected alphabetically. Samples for each character then were first aligned and the variation of their trajectories was analyzed by applying Principal Component Analysis (PCA).

Data Alignment

Trajectory Matching

For training purposes, handwriting trajectory is represented by a vector a points (or point vector) having a fixed dimension. These points can be consistently located from one sample to another. In general, extracting these points is a curve matching problem. For handwriting data, the matching problem can be simplified by exploiting the extensive studies on handwriting models.

Experimental results set forth in the paper by Li et al. entitled "Segmentation and reconstruction of on-line handwriting scripts" (cited above) show that a handwriting trajectory can be decomposed into a sequence of static strokes. In addition, each static stroke has a time-invariant curvature. In this working example, a hierarchical handwriting alignment process is used whereby handwriting trajectory is segmented into static strokes by landmark points. These strokes then are matched with each other. Because each stroke is a simple arc, points can be equidistantly sampled from the arc to represent the stroke.

The landmark points that were extracted were similar to the points extracted in the Li et al. paper. Namely, three kinds of points were extracted: (1) pen-down points and pen-up points; (2) local extrema of curvature; and, (3) inflection points of curvature. The curvature of each point is approximated by the change in the angle of the tangent. In this working example, the trajectory of a handwriting sample can be divided into up to five strokes, depending on its topological structure. For a writer with consistent writing style, samples of the same character are mostly composed of the same number of stroke and they were matched with each other naturally. In this case, a small number of abnormal samples were discarded. Otherwise, handwriting samples were divided into sub-classes according to their decomposition modes and for each sub-class a separate model was trained.

Training Set Alignment

Using the methods described above, the handwriting sample was represented by a point vector, $$X = \{(x_1^1, x_2^1, \ldots, x_{n_1}^1), \ldots, (x_1^s, \ldots, x_{n_s}^s), (y_1^1, y_2^1, \ldots, y_{n_1}^1), \ldots, (y_1^s, \ldots, y_{n_s}^s)\} \quad (3)$$

where s is the number of static strokes segmented from the sample and $n_i$ is the number of points extracted from the $i^{th}$ stroke. The following problem is to align different vectors into a common coordinate frame. In this working example, an iterative alignment approach was used. For alignment, this iterative alignment approach estimated an affine transform for each sample that transforms the sample to the coordinate frame. A deformable energy-based criterion was defined as:

$$E = -\log\left[\frac{1}{N_s}\sum_{i=1}^{N_s}\exp\left(-\frac{\|X_i - \overline{X}\|^2}{2 \cdot V_x}\right)\right] \quad (4)$$

where $N_s$ is the point number in the vectors, $\overline{X}$ is the mean vector calculated as:

$$\overline{X} = \frac{1}{N_s}\sum_{i=1}^{N_s} X_i \quad (5)$$

and $V_x$ is the variance of the Gaussian calculated as:

$$V_x = \frac{1}{N_s}\sum_{i=1}^{N_s}\|X_i - \overline{X}\|^2 \quad (6)$$

The process is formally described as follows:
1. Maintain an affine transform matrix $U_i$ for each sample, which is set to identity initially.
2. Compute the deformable energy-based criterion, E.
3. Repeat the following until convergence:
   a. For each sample $X_i$,
     i. For each one of the six unit affine matrixes, $A_j$, j=1, . . . , 6,
       A. Let $U_i^{new} = A_j \cdot U_i$
       B. Apply $U_i^{new}$ to the sample and recalculate the criterion, E.
       C. If E has been reduced, accept $U_i^{new}$, otherwise:
       D. Let $U_i^{new} = A_j^{-1} \cdot U_i$ and apply again. If E has been reduced, accept $U_i^{new}$, otherwise revert to $U_i$.
4. End Shape Models Aligned point vectors form a distribution in the $N_s$ dimensional space. By modeling this distribution, new examples can be generated that are similar to those in the training set. In this working example, Principal Component Analysis (PCA) was applied to the data. Mathematically, the covariance of the data was calculated as:

$$S = \frac{1}{s-1}\sum_{i=1}^{s}(X_i - \overline{X})(X_i - \overline{X})^T \quad (7)$$

Then the eigenvectors $\phi_i$ and corresponding eigenvalues $\lambda_i$ of S were computed and sorted so that $\lambda_i \geq \lambda_{i+1}$. The training set was approximated by:

$$X \approx \overline{X} + \Phi b \quad (8)$$

where $\Phi = (\phi_1 | \phi_2 \ldots | \phi_t)$ represents the t eigenvectors corresponding to the largest eigenvalues and b is a $v_t$ dimensional vector given by:

$$b = \Phi^T(X - \overline{X}) \quad (9)$$

By varying the elements in b, the new handwriting trajectory was generated from this model. Furthermore, by applying limits of $\pm 3\sqrt{\lambda_i}$ to the elements $b_i$, it was ensured that the generated trajectory was similar to those in the training set.

Synthesis Strategies

To synthesize a word with learned models, each individual letter in a word first was generated. Then, the baselines of these letters were aligned and they were juxtaposed in the proper sequence to form the word. The next step was to concatenate the letters with their neighbors to form a cursive handwriting. Using traditional method, however, this objective is difficult to achieve.

To illustrate this difficulty, FIGS. 14A-D illustrate a comparison between traditional connection approaches and the conditional sampling synthesis performed by the handwriting synthesis system and method. In particular, FIG. 14A illustrates the synthesized letters placed adjacent to each other without connection. As shown in FIG. 14B, directly connecting adjacent synthesized letters produces some discontinuities in the handwriting trajectory. These discontinuities are unnatural and cannot appear in a natural handwriting trajectory. As shown in FIG. 14C, by deforming the head part and the tail part of the trajectory of each character, smoother connections are achieved. The problem, however, is that it cannot be ensured that the deformed letters are still similar to those in the training set and consistent with their models. In order to overcome this problem, the handwriting synthesis system and method use a delta log-normal model based conditional sampling process. This process produces smooth and fluid connections between characters and also ensures that the deformed characters are consistent with the models. The term "conditional sampling" comes from the fact that in the process each letter is generated from models under the effects and constraints of its neighbors. FIG. 14D illustrates the connection of the synthesized letters using the conditional sampling synthesis disclosed herein. Note that the connection between characters is smooth and the shapes of the letters are consistent with the models.

Delta Log-Normal Model

Delta log-normal model is a powerful tool in analyzing rapid human movements. It describes a neuromuscular synergy in terms of the agonist and antagonist systems involved in the production of these movements. With respect to handwriting generation, the movement of a simple stroke is controlled by velocity. the magnitude of the velocity is described as:

$$v_\xi(t) = D_1 \Lambda(t; t_0, \mu_1, \sigma_1^2) - D_2 \Lambda(t; t_0, \mu_2, \sigma_2^2) \quad (10)$$

where, $$\Lambda(t; t_0, \mu, \sigma^2) = \frac{1}{\sigma\sqrt{2\pi}(t-t_0)} \exp\left\{-\frac{[\ln(t-t_0)-\mu]^2}{2\sigma^2}\right\} t_0 \leq t \quad (11)$$

is a log-normal function, where $t_0$ represents the activation time, $D_i$ are the amplitude of impulse commands, $\mu_i$ are the mean time delay, and $\sigma_i$ are the response time of the agonist and antagonist systems, respectively, on a logarithmic scale axis.

The angular of the velocity can be expressed as:

$$\theta(t) = \theta_0 + \int_{t_0}^{t} c_0 v_\xi(u) d(u) \quad (12)$$

where $\tau_0$ is the initial direction and $c_0$ is a constant. The angular velocity is calculated as the derivative of $\tau(t)$:

$$v_\theta(t) = c_0 v_\xi(t) \quad (13)$$

Given $v_\xi(t)$, the curvature along a stroke is calculated as:

$$c(t) = \lim_{\Delta s \to 0} \frac{\Delta \alpha}{\Delta s} = \lim_{\Delta t \to 0} \frac{v_\theta(t) \cdot \Delta t}{v_\xi(t) \cdot \Delta t} = c_0 \quad (14)$$

This means that the curvature along a stroke is time invariant. Thus, the static shape of the stroke is an arc, characterized by:

$$S = \langle \theta, c, D \rangle \quad (15)$$

where $\tau = \tau_0$ is the initial angular direction, $c = c_0$ is the constant curvature, and $D = D_1 - D_2$ is the arc length.

Conditional Sampling

The trajectories of the synthesized handwriting letters are decomposed into static strokes, as described above. The first stroke of a trajectory is called the head stroke ($S_h$) and the last stroke is called the tail stroke ($S_t$), where:

$$S_h = \langle \theta_h, c_h, D_h \rangle,$$

and $$S_t = \langle \theta_t, c_t, D_t \rangle,$$

respectively. In the concatenation process, the trajectories of letters was deformed to produce a natural cursive handwriting. This was achieved in part by changing the parameters of the head and the tail strokes from $S_h$ and $S_t$ to $S^*_h$ and $S^*_t$. Some energy was defined to guide the deformation process. A deformation energy of a stroke was defined as:

$$E_d^{h/t} = (\theta_{h/t}^* - \theta_{h/t})^2 + (c_{h/t}^* - c_{h/t})^2 + (D_{h/t}^* - D_{h/t})^2 \quad (16)$$

A concatenation energy between the $i^{th}$ letter and the (i+1) letter was defined as:

$$E_c(i, i+1) = \lambda_1 [E_d^t(i) + E_d^h(i+1)] + \lambda_2 [(c_t^*(i) + \theta_t^*(i) \cdot D_t^* (i) - c_h^*(i+1))^2] + \lambda_3 [\|p_t(i) - p_h(i+1)\|^2] \quad (17)$$

where $p_t(i)$ is the end point of the tail stroke of the $i^{th}$ letter, and $p_h(l+1)$ is the start point of the head stroke of the next letter. There are three items in the defined concatenation energy. The first item, which is a deformation constraint term, constrains the deformation to be smooth and gradual. The second item, which is an end point alignment term, encourages the angular direction at the end point of the previous letter to be the same (or aligned) with that of the start point of the next letter. The third item, which is an interval diminishment term, diminishes the interval between the two letters. By minimizing the second and the third items, the two letters are forced to connect with each other smoothly and naturally.

The concatenation energy of a whole word was calculated as:

$$E_c = \sum_{i=2}^{N_l-1} E_c(i, i+1) \quad (18)$$

where $N_l$ is the number of letters in the word.

Minimizing the concatenation energy can produce a smooth and natural cursive trajectory. However, as addressed above, to achieve smooth, fluid and natural synthesized handwriting it must be ensured that the deformed letters are consistent with the models. In order to achieve this objective, a sampling energy was defined. For a deformed trajectory, a corresponding $v_t$ diminishing vector b* was calculated form the model using equation (9). The sampling energy was calculated as:

$$E_s = \sum_{i=1}^{v_t} f(b_i^* / (3\sqrt{\lambda_i})) \quad (19)$$

where the function f was defined as:

$$f(x) = \begin{cases} 0 & : |x| <= 1 \\ x^2 & : |x| > 1 \end{cases} \quad (20)$$

The whole energy formulation was given as:

$$E = \lambda_c \cdot E_c + \lambda_s \cdot \sum_{i=1}^{N_l} E_s(i) \quad (21)$$

In order to minimize the total energy, an iterative minimization approach or process was used. Mathematically, this approach is described as follows:

1. Randomly generate a vector b(i) for each letter initially, where, $b_j(i) < 3\sqrt{\lambda_j}$.

2. Generate trajectories $S_i$ of letters according to their corresponding vectors b(i) and calculate an affine transform $T_i$ for each letter, which transforms each letter to its desired position.
3. For each pair of adjacent letter $\{S_i, S_{i+1}\}$, deform the strokes in these letters to minimize the concatenation energy $E_c(i, i+1)$.
4. Project the deformed shape into the model coordinate frame: $X_i = T^{-1} S_i$.
5. Update the model parameters to match to:

$X_i$: $b(i) = \Phi(i)^T(X(i) - \overline{X(i)})$.

6. Apply constraints on b(i) by making:

$|b_j(i)| <= 3\sqrt{\lambda_{(j)}}$.

7. If not converged, return to step 2.

In step 3, the concatenation energy was minimized. Mathematically, to achieve this objective a vector of parameter P(i, i+1) was calculated as:

$$P^*(i, i+1) = \langle \theta_t^*(i), c_t^*(i), D_t^*(i), \theta_h^*(i+1), c_h^*(i+1), D_h^*(i+1) \rangle \quad (22)$$
$$= \arg\min_{P(i,i+1)} E_c(i, i+1)$$

This is a multi-dimensional non-linear optimization problem that may be solved using many methods. In this working example, the Direction Set method was used to minimize the energy. The Direction Set method is a well-known method that will not be described in detail. After the iterative process is completed, a check was made on the concatenation energy between each pair of adjacent letters. A predefined energy threshold value, $E_c^T$, was used to determine whether to connect these letters. If $E_c(i,i+1) < E_c^T$, the two letters were connected and a local smooth operation was applied at the connecting point. Otherwise, the two letters were left unconnected.

EXPERIMENTAL RESULTS

Some results from the above-described working examples will now be discussed. FIGS. 15A-D illustrate a comparison between synthesized letters from the trained models and letters segmented from the training data. In particular, FIG. 15A illustrates a sample of the letter "d" that has been segmented from the handwriting sample or training data. FIG. 15B illustrates the letter "d" synthesized from a trained model of that letter. Note that the synthesized letter has a similar shape with the letter segmented from the training data. Similarly, FIG. 15C illustrates a sample of the letter "s" that was segmented from the handwriting sample. FIG. 15D illustrates a synthesized letter "s" generated from a trained model. Note again that the synthesized letter has a similar shape with the letter segmented from the training data.

Figure 17:
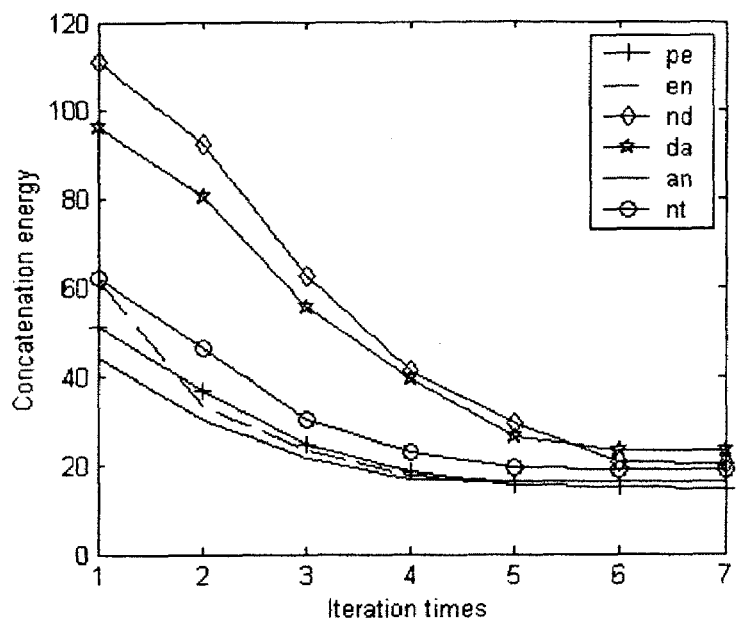
FIG. 17 illustrates a graph of the concatenation energy of each pair of adjacent letters of the word shown in FIGS. 16A-D.

FIGS. 16A-D illustrate results from synthesizing the word "pendant". In particular, the conditional sampling process was used to synthesize the word. In this example, referring to equation (17), $\lambda_1 = 25$, $\lambda_2 = 50$ and $\lambda_3 = 1$. FIG. 16A illustrates initially sampled letters of the word "pendant". FIG. 16B illustrates an intermediate result after a first iteration of the conditional sampling process. FIG. 16C illustrates an intermediate result after the second iteration of the conditional sampling process. FIG. 16D illustrates the final result of the conditional sampling process. Note the smooth and fluid connection between the letters. The concatenation energy of each pair of adjacent letters in the word "pendant" shown in FIGS. 16A-D is plotted in FIG. 17. Note that FIG. 17 shows that the concatenation energy drops rapidly in the iterative process and is typically stable after five or six iterations.

Figure 19:
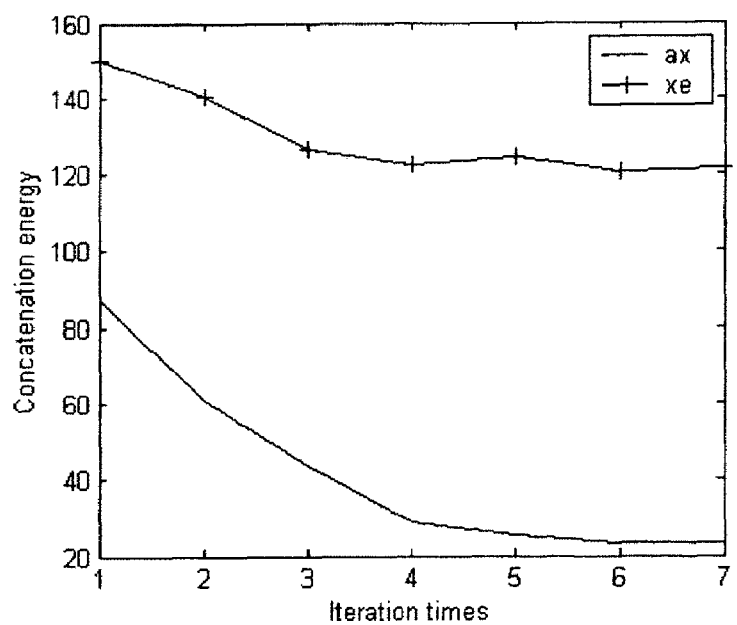
FIG. 19 illustrates a graph of the concatenation energy of each pair of adjacent letters of the word shown in FIGS. 18A-D.

FIGS. 18A-D illustrate results from synthesizing the word "axe". As above, the conditional sampling process was used to synthesize the word. FIG. 18A illustrates initially sampled letters of the word "axe". FIG. 18B illustrates an intermediate result after a first iteration of the conditional sampling process. FIG. 18C illustrates an intermediate result after the second iteration. FIG. 18D illustrates the final result of the conditional sampling process. In addition, FIG. 19 illustrates a graph of the concatenation energy of each pair of adjacent letters in the word "axe". Note that since the concatenation energy between the letters "x" and "e" cannot be minimized, these two letters were not connected. This result was consistent with the writing samples of the user wherein the letter "x" was never connected with the letters following the letter "x". These results clearly suggest that the conditional sampling process provides satisfying results on concatenating individual letters to cursive handwriting under the constraint of models.

Figures 21A, 21B:
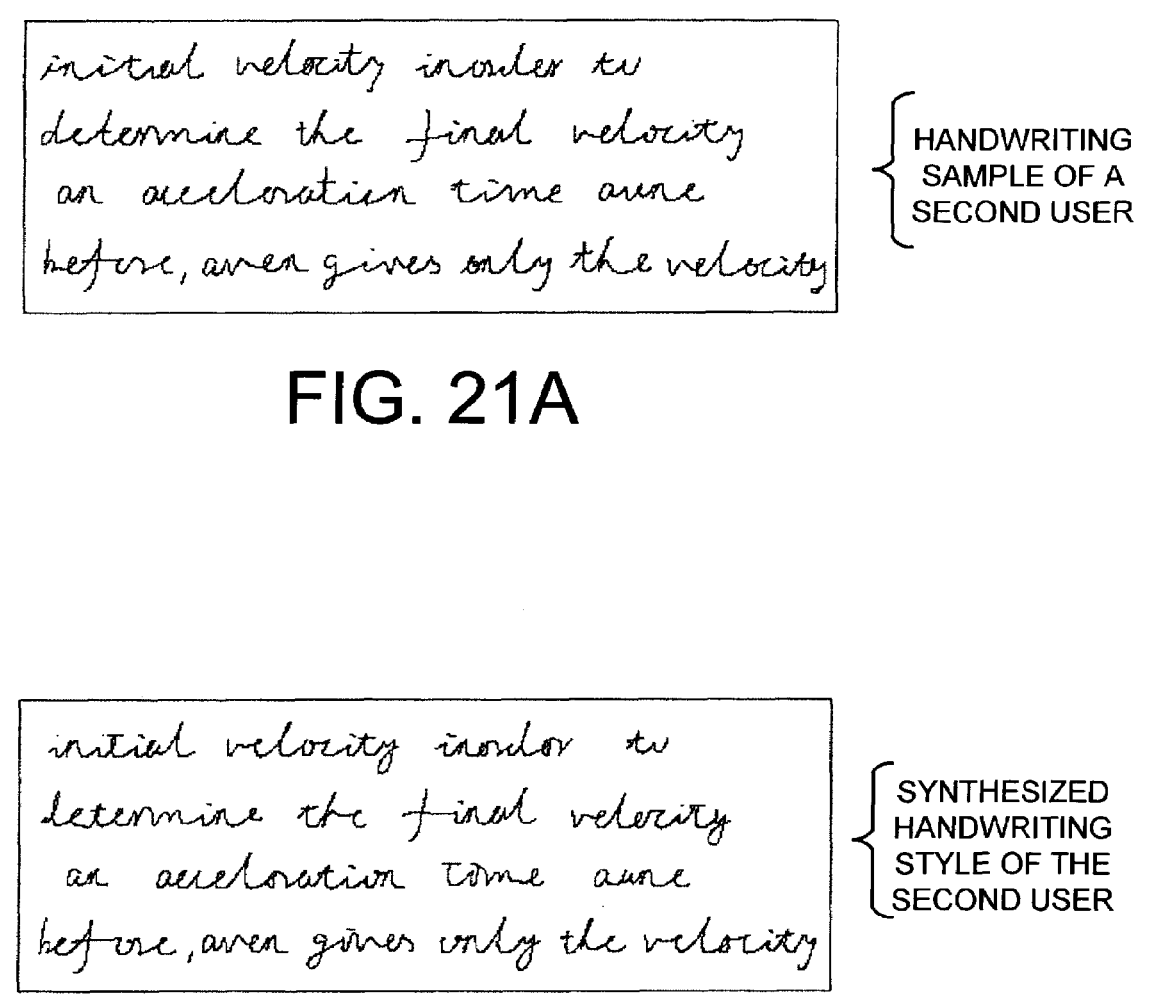

FIGS. 20A-B illustrate an example of a handwriting sample of a first user and the handwriting style of the first user synthesized by the handwriting synthesis system and method. FIG. 20A illustrates some samples written by the first user taken from the handwriting sample. FIG. 20B illustrates the same words synthesized by the handwriting synthesis system and method. Similarly, FIGS. 21A-B illustrate an example of a handwriting sample of a second user and the handwriting style of the second user synthesized by the handwriting synthesis system and method. FIG. 21A illustrates some samples written by the second user taken from the handwriting sample. FIG. 21B illustrates the same words synthesized by the handwriting synthesis system and method. These examples suggests that although the trajectories in the handwriting samples and the synthesized writings are different, the writing styles are consistent by visual examination.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A process for generating cursive handwriting, comprising:
   segmenting each handwritten word in a handwriting specimen into separate characters;
   learning shape characteristics of each of the characters;
   building learned models of each of the characters using the learned shape characteristics;
   synthesizing the cursive handwriting from the learned models; and
   calculating a concatenation energy and a sampling energy of learned models of a pair of adjacent characters in the synthesized cursive handwriting to define a total energy function that is minimized to smoothly connect the adjacent characters.

2. The process as set forth in claim 1, further comprising clustering characters having similar shape characteristics by calculating a script code for each of the characters.

3. The process as set forth in claim 1, further comprising decomposing the characters into point vectors and extracting the point vectors.

4. The process as set forth in claim 3, further comprising learning parameters of the shape characteristics.

5. One or more computer-readable media having computer-readable instructions thereon which, when executed by one or more processors, cause the one or more processors to implement the method of claim 1.

6. A handwriting synthesis system, comprising:
   a segmentation module that segments a handwriting sample into training samples of individual characters;
   a learning module that builds learned models of each handwritten character using the training samples, the learning module further comprising:
      an alignment module that takes the training samples and normalizes and aligns point vectors for each training sample; and
      a modeling module that takes the aligned point vectors and learns shape characteristics of each individual character using statistical analysis such that statistical parameters are determined for the shape characteristics;
   a synthesis module that synthesizes handwriting using the learned models, the synthesis module further comprising:
      a concatenation module that joins synthesized characters with neighboring characters as necessary to form text and words of synthesized handwriting, the concatenation module further comprising:
         a concatenation energy module that calculates a concatenation energy of a synthesized word;
         a sampling energy module that calculates a sampling energy to ensure that a deformed synthesized character is consistent with a model of that individual character; and
         an energy minimization module that minimizes a total energy of the combined concatenation and sampling energies to determine a point of connection of a synthesized character to its neighbors.

* * * * *